(12) United States Patent
Algrain et al.

(10) Patent No.: US 6,803,677 B2
(45) Date of Patent: Oct. 12, 2004

(54) SYSTEM FOR PROVIDING MULTIPLE POWER CONVERSION OPERATIONS

(75) Inventors: Marcelo C. Algrain, Peoria, IL (US); James P. Johnson, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 407 days.

(21) Appl. No.: 10/100,923

(22) Filed: Mar. 20, 2002

(65) Prior Publication Data

US 2003/0178889 A1 Sep. 25, 2003

(51) Int. Cl.[7] .................................................. H02J 7/34
(52) U.S. Cl. ........................................................ 307/44
(58) Field of Search .............................. 307/43, 44, 46

(56) References Cited

U.S. PATENT DOCUMENTS 5,804,953 A   9/1998  Bowyer et al.
6,021,052 A   2/2000  Unger et al.

Primary Examiner—Gregory J. Toatley, Jr.
(74) Attorney, Agent, or Firm—Finnegan, Henderson, Farabow, Garrett & Dunner, L.L.P.

(57) ABSTRACT

A system may be provided to perform multiple power conversion operations. The system may include a transformer interconnected between a high voltage DC bus and a low voltage DC bus, and an AC load connected to the transformer through an AC power supply line. The system may be configured to simultaneously provide power from the low voltage DC bus to the high voltage DC bus and the AC load, through the transformer. Further, the system may also be configured to simultaneously provide power from the high voltage DC bus to the low voltage DC bus and the AC load, through the transformer. And, the system may be configured to simultaneously provide power from a shore power source to the AC load, and, to the low voltage DC bus and high voltage DC bus through the transformer.

33 Claims, 4 Drawing Sheets

SYSTEM FOR PROVIDING MULTIPLE POWER CONVERSION OPERATIONS

TECHNICAL FIELD

This invention relates generally to power converting systems, and more particularly to systems and methods for providing a multi-function power converting system including low and high voltage buses.

BACKGROUND

The increase in the cost of operating certain equipment, such as engine driven vehicles, and government standards associated with these types of equipment, has sparked a growth in the design and implementation of electrical-based components, such as electro-mechanical power sources and controllers. For example, in certain vehicles, selected parts, such as belts, pulleys, gear driven components, etc., may be controlled or replaced with electrical-based components. Such re-designing may enable a manufacture to reduce the cost of a vehicle by eliminating components, reduce costs associated with the wear and tear of these moving parts, and reduce emissions.

Typically, in systems that utilize electrical-based components, such as headlights for a vehicle, power may be supplied by an internal power source, such as a battery. These systems may also allow the battery to be charged from an external source through power conversion circuits. Further, these systems may also provide AC power to selected components by converting the DC power provided by the battery source through an inverter circuit. Although these systems provide versatile power supply and control capabilities, they are limited to low voltage applications. Further, the cost of these systems increases with each additional conversion function implemented because each function may be provided as a discrete component that may require corresponding support components, such as individual isolation transformers, converter components and controllers. Accordingly, typical systems that are designed to provide multiple power conversion capabilities may include redundant components dedicated to a particular conversion function.

One such system is described in U.S. Pat. No. 6,021,052, issued to Unger et al. This patent describes a power converter system that implements a plurality of controllers for various modes of operation. The system may supply energy to a DC bus from a load balancing storage element when the voltage of the DC bus is decreasing and store energy from the DC bus in the storage element when the voltage of the DC bus is increasing. Further, the system may selectively transfer energy from the DC bus to an AC port. Although the power converting system described by Unger et al. may provide multiple conversion functions, these functions are selectively performed and controlled by dedicated controlling circuitry. Accordingly, the system described by Unger et al. results in a system that is more costly and is limited to selective modes of operation associated with a low voltage DC bus and AC ports.

Methods and systems consistent with certain features of the present invention are directed to solving one or more of the problems set forth above.

SUMMARY OF THE INVENTION

In an aspect of the present invention, a multi-function system is provided that may include a high voltage DC bus, a low voltage DC bus, and a transformer connected between the high voltage DC bus and the low voltage DC bus. The system may be configured to simultaneously provide power from the low voltage DC bus to the high voltage DC bus and an AC load through the transformer. Further, the system may also simultaneously provide power from the high voltage DC bus to the low voltage DC bus and the AC load through the transformer. And, the system may simultaneously provide power from a shore power source to the AC load, and to the low voltage DC bus and high voltage DC bus through the transformer.

In another aspect of the invention, a system is provided that may include a high voltage bus, a low voltage bus, and a transformer disposed between the high voltage and low voltage buses. The system may also include a first inverter/rectifier circuit connected between the high voltage bus and a primary side of the transformer, a second inverter/rectifier circuit interconnected between the low voltage bus and a secondary side of the transformer, and an AC load connected to a tap positioned on the secondary side of the transformer. The system may be configured to selectively provide power simultaneously to the high voltage bus through the first inverter/rectifier circuit and power to the AC load through the tap. Further, the system may selectively provide power simultaneously to the low voltage bus through the second inverter/rectifier circuit and power to the AC load through the tap. Additionally, the system may selectively provide power simultaneously to the AC load from a shore power source and power to the low voltage bus through the second inverter/rectifier circuit and power to the high voltage bus through the first inverter/rectifier circuit.

BRIEF DESCRIPTION OF THE DRAWINGS

The accompanying drawings, which are incorporated in and constitute a part of this specification, illustrate several aspects of the invention and together with the description, serve to explain the principles of the invention. In the drawings.

DETAILED DESCRIPTION

Reference will now be made in detail to the exemplary aspects of the invention, examples of which are illustrated in the accompanying drawings. Wherever possible, the same reference numbers will be used throughout the drawings to refer to the same or like parts.

Figure 1:
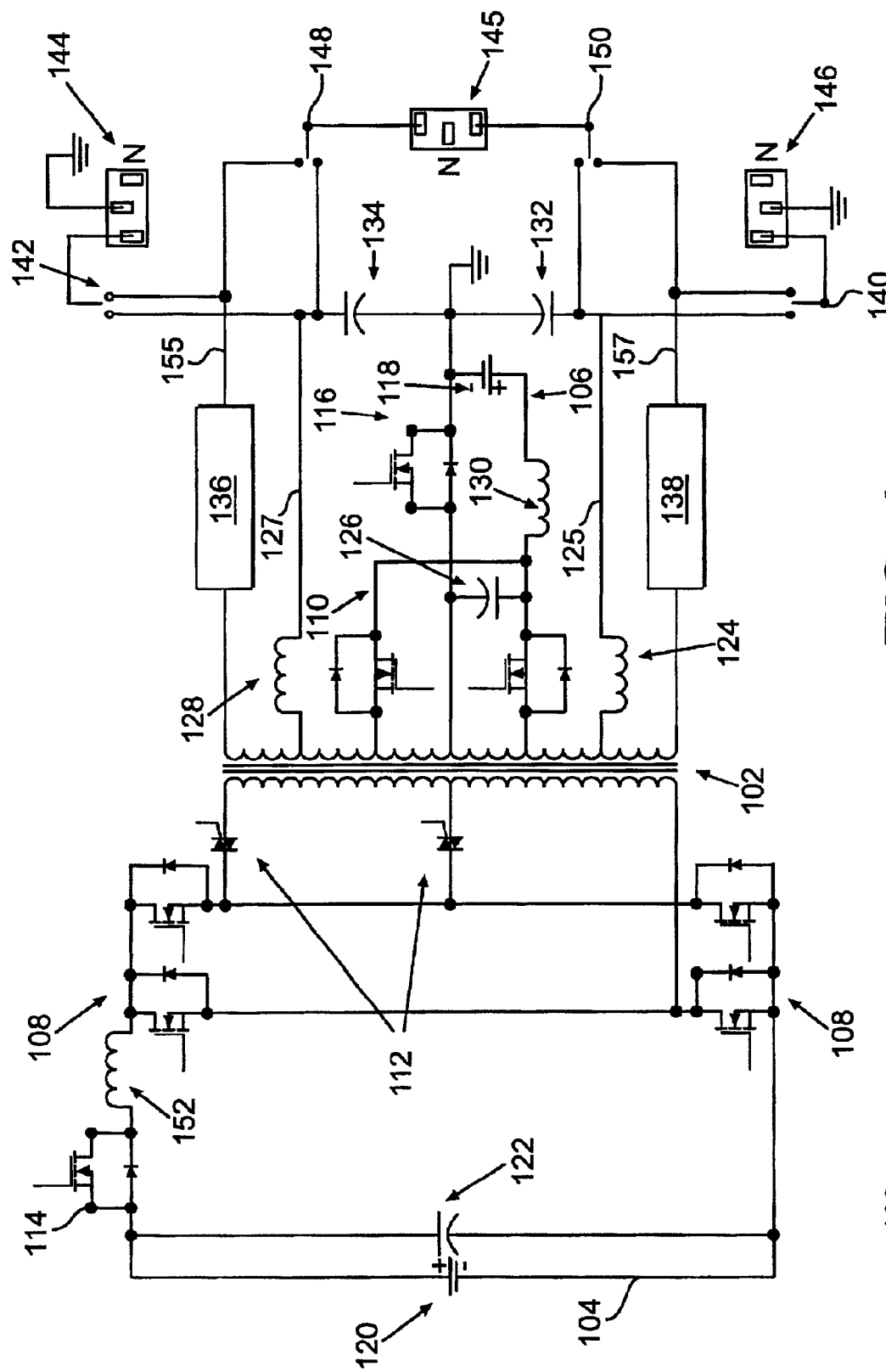
FIG. 1 illustrates a schematic diagram of one exemplary embodiment consistent with certain principles related to the present invention.

FIG. 1 illustrates an exemplary system 100 in which features and principles consistent with the present invention may be implemented. As shown, the exemplary system 100 may include a high frequency multi-tap transformer 102. On either side of transformer 102 may be voltage buses. On the primary side of transformer 102 is a high voltage bus 104, while on the secondary side is a low voltage bus 106.

High voltage bus 104 may include a battery, which may be, for example, a high voltage battery set 120 such as 24-12V batteries providing 340V to one or more loads attached to the high voltage bus. Further, high voltage bus 104 may include a power source (not shown), such as an alternator/starter, that may provide power to high voltage bus loads. These loads may include components that use high voltage power, such as an oil pump motor drive and a water pump motor drive. Similar to the high voltage bus 104, the low voltage bus 106 may also include a battery, which may be a low voltage battery 118, such as a 12V or 24V battery. Low voltage bus 106 may provide power to components that require low voltage power to operate, such as headlamps in a vehicle. One skilled in the art would realize that the type of loads attached to the low and high voltage buses, 106, 104 respectively, may vary based on the application of system 100, and the exemplary loads described above are not intended to be limiting.

System 100 may also include AC outlets 144, 145, and 146. In one aspect consistent with certain features related to the present invention, outlets 144 and 146 may be three prong outlets associated with a predetermined voltage, such as 120 VAC, while outlet 145 may be a four prong outlet associated with another voltage, such as 240 VAC. One skilled in the art would realize that the configuration of, and voltage values associated with, outlets 144–146 may vary and are not limited to the examples listed above. For example, outlets 144 and 146 may be associated with 110 VAC, while outlet 145 may be associated 220 VAC. Additionally, outlets 144, 145, and 146 may be connected to a shore power source, such as local utility that provides power in various voltages to system 100, such as 120 VAC and 240 VAC.

System 100 may also include on the high voltage side of transformer 102 an H-bridge inverter/full-bridge rectifier 108. Inverter/rectifier 108 may operate as an H-bridge inverter to provide an AC signal to transformer 102 during certain modes of operation. Further, inverter/rectifier 108 may also use free wheeling diodes to operate as a rectifier to provide DC power from transformer 102 to high voltage bus 104. In one aspect consistent with certain features related to the present invention, the H-bridge inverter operation may use sine triangle pulse width modulation functions to produce a sinusoidal element in the signal provided at the output of inverter/rectifier 108 to transformer 102. One skilled in the art would realize that various other modulation techniques that produce a sine wave signal with a particular frequency, such as space vector modulation, may be implemented without departing from the scope of the invention. Further, although H-bridge inverter/full-bridge rectifier 108 is shown in FIG. 1 including MOS FETs to produce the alternating current for transformer 108, one skilled in the art would realize that other types of transistors may be implemented without departing from the scope of the present invention.

System 100 may also include on the low voltage side of transformer 102 a push-pull inverter/full-wave center tap rectifier 110. Inverter/rectifier 110 may operate as a push-pull inverter to provide an AC signal to transformer 102 during certain modes of operation. Further, inverter/rectifier 110 may also use free wheeling diodes to operate as a rectifier to provide DC power from transformer 102 to the low voltage bus 106. In one aspect consistent with certain features related to the present invention, the push-pull inverter operation associated with inverter/rectifier 110 may use sine triangle pulse width modulation functions to produce a sinusoidal element in the signal provided to transformer 102. One skilled in the art would realize that various other modulation techniques that produce a sine wave signal with a particular frequency, such as space vector modulation, may be implemented without departing from the scope of the invention. Further, although inverter/rectifier 110 is shown in FIG. 1 including MOS FETs, one skilled in the art would realize that other types of transistors may be implemented without departing from the scope of the present invention.

As shown in FIG. 1, system 100 may include a plurality of additional components that perform various functions consistent with certain features related to the present invention. These components and their functions will be described below with respect to the various functions that may be performed by system 100. The operations may include up and down conversion capabilities, while simultaneously providing AC power to outlets 144, 145, and 146. Additionally, methods and systems consistent with certain features related to the present invention may provide shore power capabilities simultaneously with selective up and down power conversion capabilities.

Figure 2:
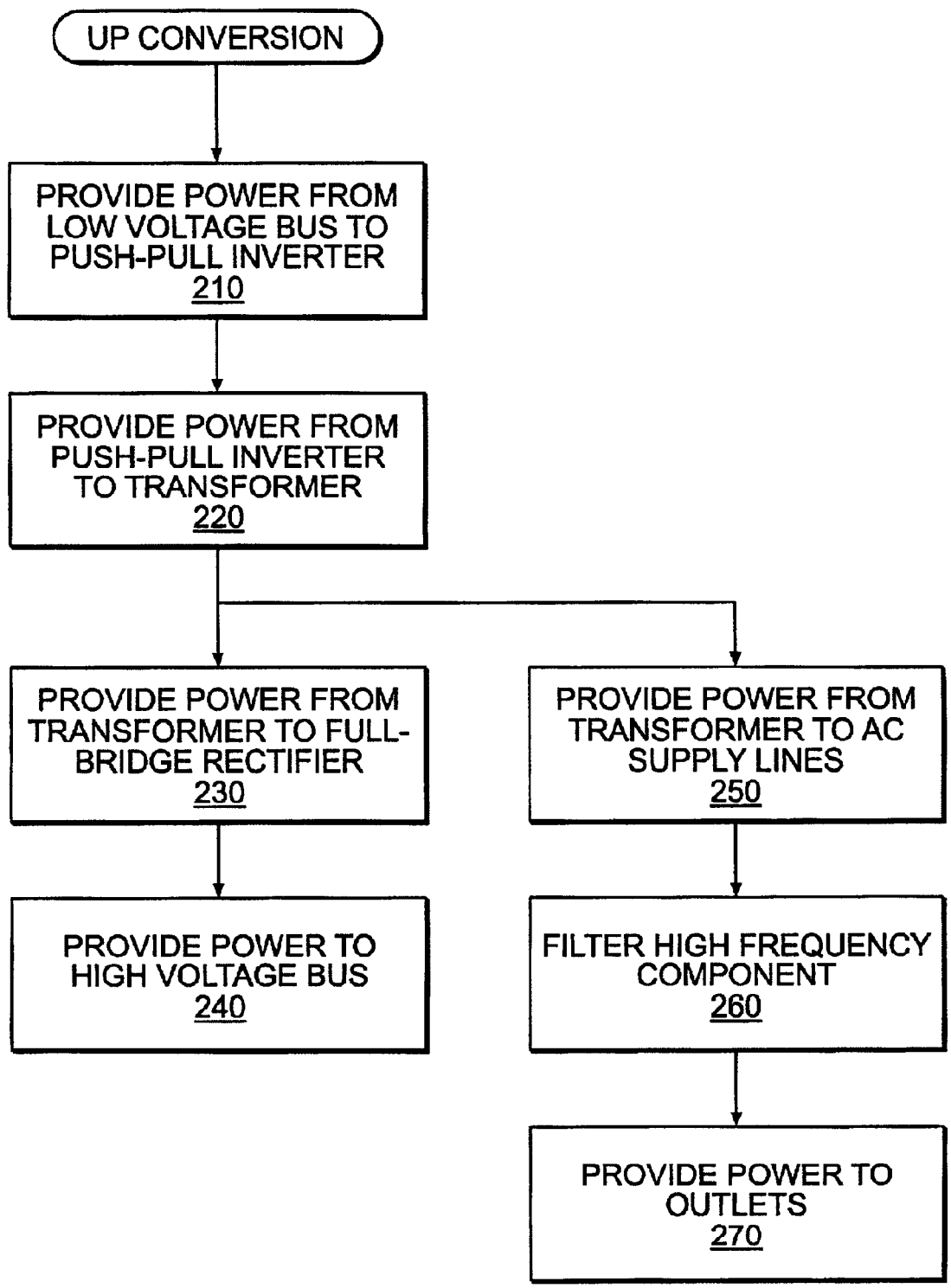
FIG. 2 illustrates a flowchart of an exemplary up conversion process consistent with certain principles related to the present invention.

FIG. 2 shows a flowchart of one exemplary up-conversion process that may be performed by system 100. As shown, this process may be performed when system 100 provides power from low voltage bus 106 to push-pull inverter/full-wave center tap rectifier 110 (Step 210). During this process, inverter/rectifier 110 may be operating as a push-pull inverter, to produce an AC signal. The AC signal may then be provided to transformer 102 (Step 220). In one aspect consistent with certain features related to the present invention, inverter/rectifier 110 may provide a sine triangle pulse width modulated high frequency AC signal to transformer 102.

Once transformer 102 receives the high frequency AC signal from push-pull inverter 110, it may provide a stepped up voltage signal to inverter/rectifier 108 through electronic tap changer 112 (Step 230). The electronic tap changer 112 may allow transformer 102 to be used by system 100 for operations requiring more than one turns ratio for up/down conversion operations. When system 100 is operating in the up conversion mode of operation, inverter/rectifier 108 may operate as a rectifier circuit to produce a DC signal. This DC signal may be filtered by a filter including inductor 152 and capacitor 122, which filters the high frequency component of the signal provided by transformer 102. System 100 may then provide the filtered DC signal to high voltage bus 104 (Step 240). The DC signal may provide power to loads connected to high voltage bus 104 or may provide power to charge battery 120. One skilled in the art would realize that any known type of electronic tap changer 112, or equivalent circuit, may be implemented by system 100 without departing from the scope of the invention.

Simultaneously with system 100 providing power to the high voltage bus 104 from the low voltage bus 106, system 100 may also provide AC power to one or more AC loads (e.g., outlets 144, 145, and 146). To perform such functions, system 100 may provide a high frequency AC signal(s) from transformer 102, which was produced by push-pull inverter 110, to AC supply lines 125 and 127, respectively (Step 250). The high frequency component of the AC signal(s) may be filtered to produce an AC power signal, such as a 60 Hz, or 50 Hz, 120 VAC signal (Step 260). In one aspect consistent with certain features related to the present invention, the high frequency component associated with the high frequency signal provided to supply line 125 may be filtered by a filter circuit including inductor 124 and capacitor 132. Further, the high frequency component associated with the AC signal provided to supply line 127 may be filtered by a filter circuit including inductor 128 and capacitor 134. Once filtered, system 100 may provide the signals to outlets 144, 145, and 146 for supplying power to corresponding AC loads (Step 270).

In one aspect of the invention, the filtered AC signal may be selectively provided to outlets 144 and 146 based on the position of the 4-pole, 2-throw switches associated with each of these outlets, namely switches 142 and 140, respectively. For example, when system 100 is configured to provide power to outlet 144, switch 142 may be positioned such that a connection is made with supply line 127. Alternatively, when system 100 is configured to provide power to outlet 146, switch 140 may be positioned such that a connection is made with supply line 125. System 100 may allow both outlets 144 and 146 to receive power from their respective supply lines, allow only one outlet to receive a corresponding AC signal, or prevent both outlets 144 and 146 from receiving the filtered AC signal.

In addition to providing AC signals, such as 120 VAC, to outlets 144 and 146, methods and systems consistent with certain features related to the present invention may allow system 100 to provide AC signals to outlet 145, which may be associated with a different voltage level than that of outlets 144 and 146. System 100 may be configured to provide this feature of the present invention by positioning switch 148 such that it makes a connection with supply line 127 and by positioning switch 150 such that it makes a connection with supply line 125. Accordingly, the two supply lines, 125 and 127, provide an AC signal to outlet 145. This may allow outlet 145 to receive AC power at a different voltage level than that provided to outlets 144 and 146. For example, if supply lines 125 and 127 are providing 120 VAC to outlets 144 and 146, respectively, outlet 145 may receive 240 VAC. One skilled in the art would realize that various voltage levels may be provided based on the application of system 100 without departing from the scope of the present invention. Further, one skilled in the art would realize that the number of outlets implemented by system 100 is not limited to the three shown in FIG. 1. That is, additional, or fewer, outlets may be implemented without departing from the scope of the present invention. Switches 140, 142, 148, and 150 may be manually or automatically operated, depending on the application of system 100.

As described, methods and systems consistent with certain features related to the present invention may enable system 100 to not only provide power to high voltage bus 104 from low voltage bus 106, but also simultaneously provide AC power to one or more AC loads. Additionally, system 100 may also be configured to provide power from high voltage bus 104 to low voltage bus 106.

Figure 3:
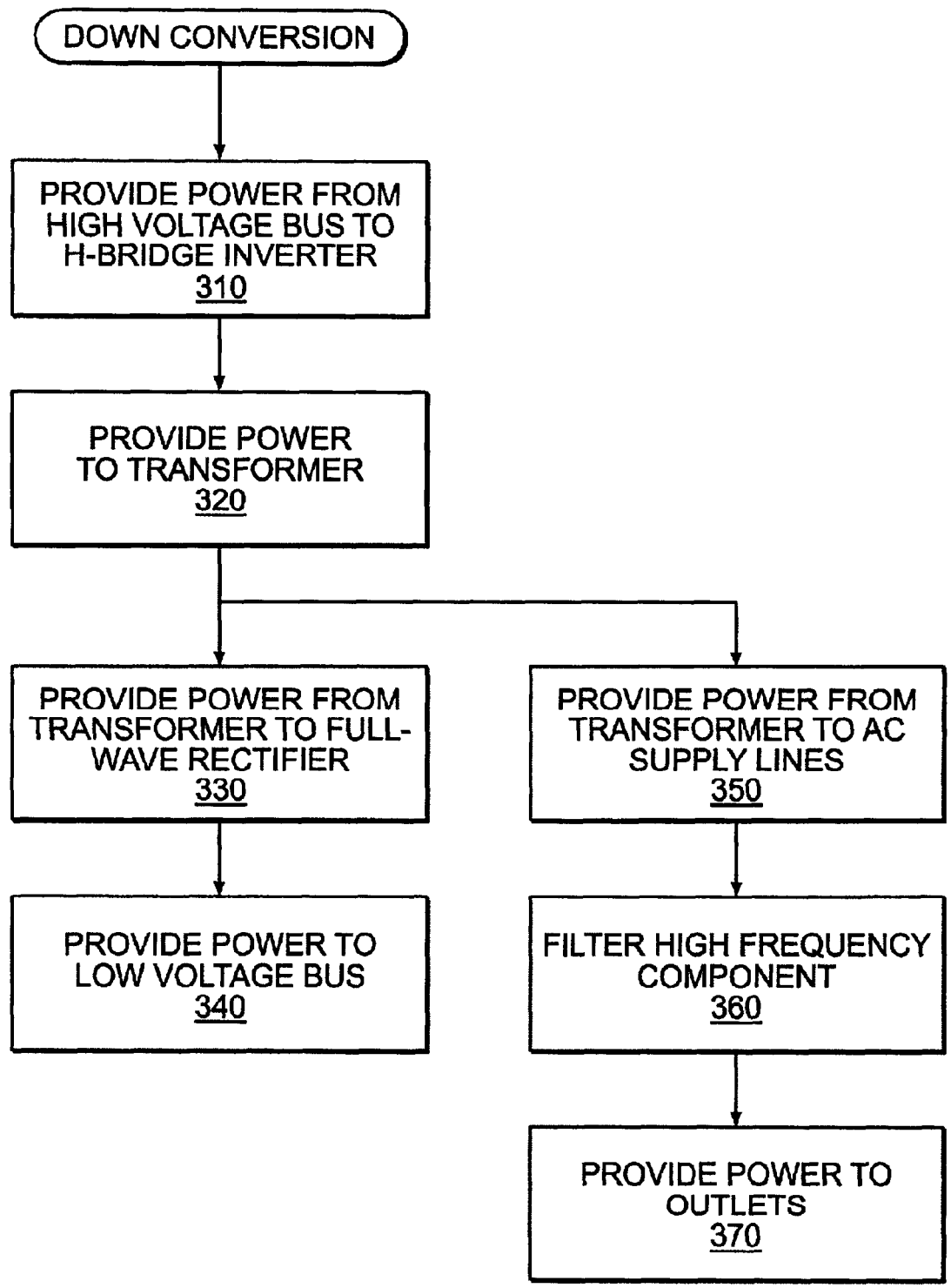
FIG. 3 illustrates a flowchart of an exemplary down conversion process consistent with certain principles related to the present invention.

FIG. 3 shows a flowchart of an exemplary down conversion process that may be performed by system 100 consistent with certain features related to the present invention. As shown, to provide down conversion capabilities, system 100 may provide power from high voltage bus 104 to inverter/rectifier 108 (Step 310). In this mode of operation, inverter/rectifier 108 may be operating as an H-bridge inverter to produce an AC signal. In one aspect of the present invention, inverter 108 may be configured to provide a sine triangle pulse width modulated high frequency AC signal. The AC signal may be provided to transformer 102, where it may be stepped down based on a turns ratio associated with the transformer (Step 320).

System 100 may provide the stepped down AC signal to inverter/rectifier 110 to produce a DC signal (Step 330). During this mode of operation, inverter/rectifier 110 may be operating as a full-wave center-tap rectifier to produce the DC signal. System 100 may then provide the DC signal to low voltage bus 106 through a filter circuit including inductor 130 and capacitor 126. The filtered DC signal may provide power to components connected to low voltage bus 106 and/or provide power to charge battery 118 (Step 340).

Simultaneously with providing power from high voltage bus 104 to low voltage bus 106, system 100 may also selectively provide AC power to outlets 144, 145, and 146. To provide such functions, system 100 may provide a high frequency AC signal(s) from transformer 102 (produced by H-bridge inverter 108) to AC supply lines 125 and 127, respectively (Step 350). The high frequency component of the AC signal(s) may be filtered to produce an AC signal, such as a 60 Hz, or 50 Hz, 120 VAC signal (Step 360). The AC signal(s) provided to supply lines 125 and 127 may be filtered using the same filter circuits described above with respect to Step 260. That is, the AC signal on supply line 125 may be filtered by inductor 124 and capacitor 132, while the AC signal on supply line 127 may be filtered by inductor 128 and capacitor 134. Once filtered, system 100 may provide the AC signals to outlets 144, 145, and 146 for supplying power to corresponding AC loads (Step 370).

Similar to the operation associated with the up conversion process, the filtered AC signal provided during the down conversion process may be selectively provided to outlets 144, 145, and 146 based on the position of the 4-pole, 2-throw switches associated with each of these outlets, namely switches 142, 140, and 148, 150, respectively. Further, as previously described with respect to the up conversion process, system 100 may provide a different voltage level to outlet 145, such as 240 VAC, than that provided to outlets 144 and 146, such as 120 VAC.

As described, methods and systems consistent with certain features related to the present invention may enable system 100 to not only provide power to low voltage bus 106 from high voltage bus 104, but also simultaneously provide AC power to one or more AC loads. In addition to these features, system 100 may also be configured to provide shore power capabilities.

Figure 4:
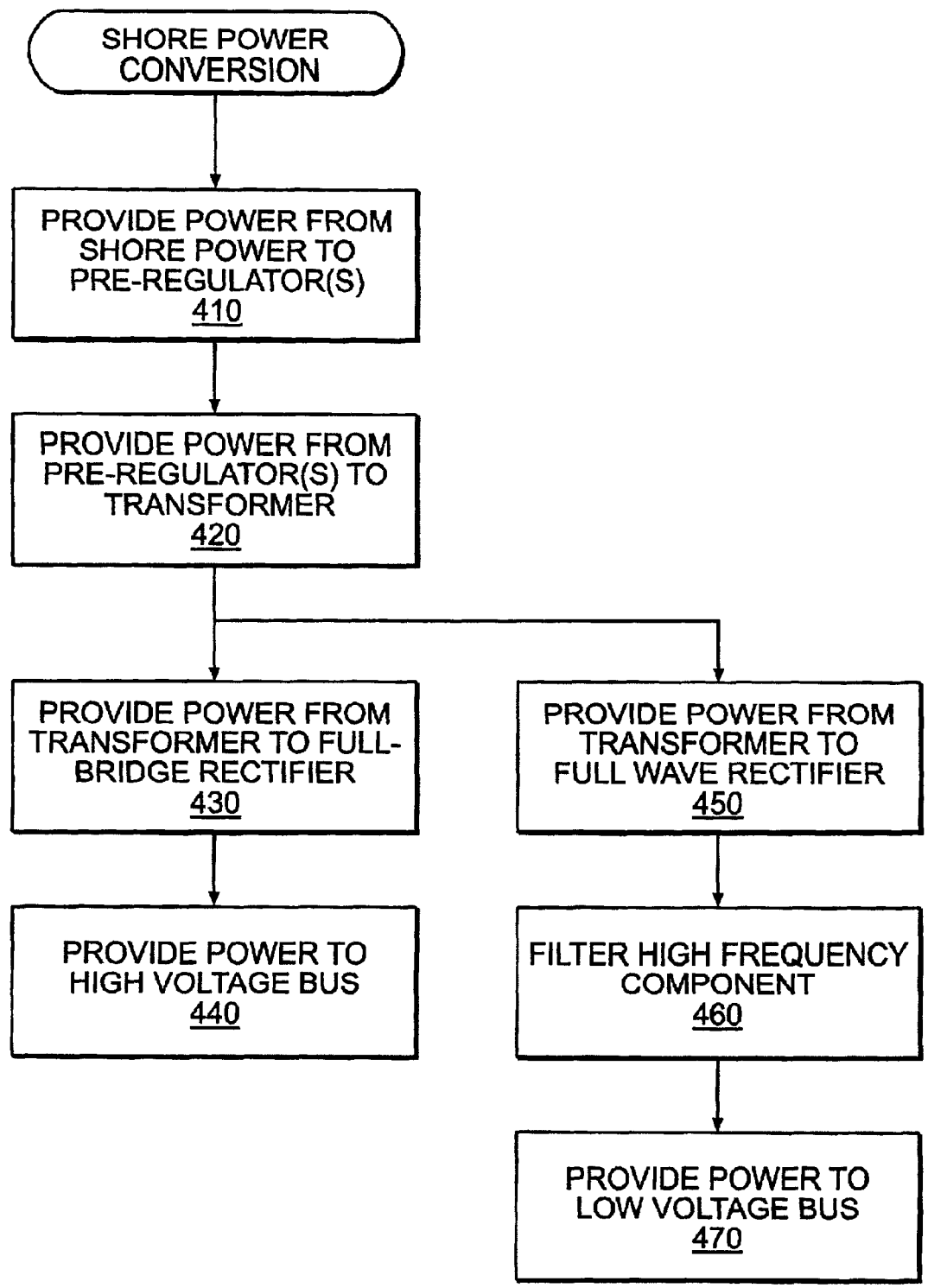
FIG. 4 illustrates a flowchart of an exemplary shore power conversion process consistent with certain principles related to the present invention.

FIG. 4 shows a flowchart of an exemplary shore power process that system 100 may implement consistent with certain features related to the present invention. During this process, system 100 may provide power from a shore power source, such as a utility source, to outlets 144, 145, and 146. In one aspect of the invention, system 100 may provide various voltage levels to these outlets based on the position of the 4-pole, 2-throw switches 140, 142, 148, and 150. For example, in the event system 100 is configured to provide AC power from the shore power source through outlet 144, switch 142 may be positioned to make a connection to supply line 155. Alternatively, if system 100 is configured to provide AC power from the shore power source through outlet 146, switch 140 may be positioned to make a connection to supply line 157. Further, in the event system 100 is configured to provide AC power from the shore power source through outlet 145, switch 148 may be positioned to make a connection with a supply line 155, and switch 150 maybe positioned to make a connection to a supply line 157.

Depending on the position of switches 140, 142, 148, and 150, system 100 may provide the AC power from the shore power to either pre-regulator 136 or 138, or in the case where power is provided through outlet 145, both pre-regulators 136 and 138 (Step 410). Pre-regulators 136 and 138 each may be a circuit that acts as a second stage inverter to produce an AC signal at a higher frequency than that received from corresponding supply lines 157 and 155. For example, pre-regulator 138 may be configured to convert a 120 VAC 60 Hz signal received from outlet 146 to a 50–100 KHz AC signal, while preregulator 136 may be configured to convert a 120 VAC 60 Hz signal received from outlet 144 to a 50–100 KHz AC signal. Alternatively, the frequency provided by the pre-regulators 136, 138 may be in the range of, for example, 200–500 KHz. One skilled in the art would realize that the frequency values associated with the AC signal provided by pre-regulators 136, 138 may vary and are not limited to the examples listed above. Further, any known pre-regulator circuit may be implemented by system 100 to produce a high frequency AC signal that may be provided to transformer 102.

System 100 may then provide the high frequency AC signal to transformer 102 (Step 420). The transformer 102 may step up the voltage received by pre-regulator(s) 136, 138, and provide the high voltage, high frequency AC signal to inverter/rectifier 108 through electronic tap changer 112 (Step 430). In this mode of operation, inverter/rectifier 108 may be operating as a full bridge rectifier to produce a high voltage DC signal from the high frequency AC signal. System 100 may filter the high frequency component associated with the high voltage DC signal provided by rectifier 108 using inductor 152 and capacitor 122 and provide the filtered DC signal to high voltage bus 104 for providing power to selected loads and/or battery 120.

In one aspect of the invention, system 100 may also be configured to provide power to the low voltage bus 106 at the same time power is provided to the high voltage bus 104. To perform this function, system 100 may provide a high frequency AC signal from transformer 102 to inverter/rectifier 110 (Step 450). In this mode of operation, inverter/rectifier 110 may operate as a full-wave center-tap rectifier that produces a DC signal. System 100 may filter the DC signal produced by rectifier 110 using inductor 130 and capacitor 126 (Step 460). The filtered DC signal may then be provided to low voltage bus 106 to provide low voltage power to selected loads and battery 118 (Step 470).

As described, methods and systems consistent with certain features related to the present invention may allow system 100 to not only provide shore power to selected loads supported by system 100, but also simultaneously provide power to high voltage bus 104 and low voltage bus 106. Additionally, system 100 may be configured to selectively control the provision of power to either the low voltage bus 106 or high voltage bus 104. For instance, a chopper circuit 114 may be configured to control the amount of current (power) provided to high voltage bus 104, while chopper circuit 116 may control the amount of current (power) provided to low voltage bus 106. The chopper circuits 114 and 116 may be configured to allow system 100 to allow full power to flow to their respective voltage buses (i.e., no restriction of current) or restrict the amount of current provided to their respective buses. For example, system 100 may be configured such that chopper circuit 114 restricts the amount of current provided to high voltage bus 104 while chopper circuit 116 allows all of the current in a DC signal to flow from rectifier 110 to the low voltage bus 104. Alternatively, system 100 may be configured such that chopper circuit 114 allows all of the current in a DC signal to flow to high voltage bus 104, while chopper circuit 116 may restrict the amount of current provided to low voltage bus 106. Further, either chopper circuit 114 and 116 may be used to block current (power) from flowing to their respective voltage buses, either simultaneously, or one at a time. Chopper circuits 114 and 116 may regulate their corresponding DC high and low bus voltages when operating in an up or down conversion mode to allow the AC loads (e.g., outlets 144, 145, and 146) to remain unchanged when different loads are applied to the low and high voltage buses, 106, 104, respectively. In one aspect of the invention, a series zener diode (not shown) may be implemented across the inductors 152 and 130 to prevent spikes due to the current limiting operations of chopper circuits 114 and 116.

INDUSTRIAL APPLICABILITY

Methods and systems consistent with certain features related to the present invention provide a multi-function power conversion system that may perform various power conversion operations selectively and simultaneously. These operations may include up/down conversion, single phase inversion, and shore power conversion operations. The disclosed invention is useful, for example, in providing a conversion system that provides multiple functions using simplified components, thus reducing the size and cost of the system itself.

In one aspect of the invention, the system may be configured to provide power from a low voltage DC bus to a high voltage DC bus through a high frequency transformer. The transformer may provide a stepped up high frequency AC signal that is rectified and filtered before being provided to the high voltage DC bus. In addition to providing power to the high voltage DC bus from the low voltage DC bus, the system may simultaneously provide AC power to AC loads positioned on the low voltage side of the transformer.

In another aspect of the invention, the system may provide power from the high voltage DC bus to the low voltage DC bus through the high frequency transformer. The transformer may provide a stepped up high frequency AC signal that is rectified and filtered before being provided to the low voltage DC bus. In addition to providing power to the low voltage DC bus from the high voltage DC bus, the system may simultaneously provide AC power to AC loads positioned on the low voltage side of the transformer.

In yet another aspect of the present invention, the system may also provide power from a shore power source to the AC loads positioned on the low voltage side of the transformer. At the same time, power from the shore power source may be fed to the high frequency transformer where it provide high voltage AC signals on its high voltage side and low voltage AC signals on its low voltage side. The high voltage AC signals may be rectified, filtered, and provided to the high voltage bus, while the low voltage AC signals may be rectified, filtered, and provided to the low voltage bus.

In another aspect of the invention, system 100 may provide single phase inversion capabilities while performing up and/or down conversion operations through inverter circuits (108 and 110) positioned on either side of a multi-tap transformer 102. These circuits may produce a high frequency sine triangle pulse width modulated AC signal that may be stepped up or down by transformer 102, depending on which inverter circuit (108, 110) provided the AC signal.

In one aspect of the invention, system 100 maybe implemented in an environment where up/down conversion, single phase inversion, and/or shore power conversion/capabilities are implemented. For example, system 100 may be configured to supplement or replace a plurality of systems that collectively provide the above listed functions. Therefore, system 100 may reduce the overall cost and size of the environment in which it is implemented. It is anticipated that a 50% reduction in relative costs may be obtained by an environment implementing system 100 as compared to implementing each component separately to achieve the same capabilities.

Methods and systems consistent with certain features related to the present invention may be implemented in any system where up/down conversion, single phase inversion, and/or shore power conversion capabilities are required. For example, in one aspect of the present invention, system 100 may be implemented in a vehicle, either electric motor driven or conventional engine driven. The high voltage bus 104 may provide power to components that require high voltage power, such as motor drives for liquid pumps, alternator/starter devices, etc. Further, the low voltage bus 106 may provide power to components requiring low voltage power, such as headlights. Additionally, the same system may also provide AC power to loads requiring AC voltages, such as appliances and devices used in a motor home or tractor trailer cab, etc. Further, system 100 may be implemented in water based vehicles, such as a ship or boat.

In another aspect of the invention, system 100 may be implemented in non-vehicle environments. For example, environments implemented in a dwelling or structure, such as a building or household, may incorporate system 100 to provide the multi-function capabilities consistent with certain features related to the present invention. Also, portable systems, equipment, devices, etc. that require high and low DC voltages, and/or AC power, may implement systems and methods consistent with certain features related to the present invention to obtain the power conversion functions described above.

As described, methods and system consistent with certain aspects related to the present invention may provide multi-function power conversion capabilities to various types of voltage buses. Although FIG. 1 shows system 100 implementing certain types of circuits and components to perform these multi-function capabilities, one skilled in the art would realize that the configuration of system 100 is not limited to that depicted in the figure. For example, various types of components, such as different transistors, types of diodes, capacitors, inductors, etc., may be implemented without departing from the scope of the present invention. Further, different circuit configurations, such as those associated with rectifier/inverters 108 and 110, pre-regulators 136 138, filter circuits, outlets 144–146, switches 140, 142, 148, and 150, may also be implemented without departing from the scope of the present invention.

Additionally, one skilled in the art would realize that the aspects of the present invention may be performed in various modes of operation without departing from the scope of the present invention. That is, system 100 may be configured to allow power to be provided from low voltage bus 106 to high voltage bus 104, while not supplying power to an AC load. Conversely, system 100 may prevent AC power from being supplied to an AC load when supplying power from low voltage bus 106 to high voltage bus 104.

The features, aspects and principles of the present invention may be implemented in various environments. Such environments and related applications may be specially constructed for performing the various processes and operations of the invention. The processes disclosed herein are not inherently related to any particular system, and may be implemented by a suitable combination of electrical-based components. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method performed by a multi-function system including a high voltage DC bus, a low voltage DC bus, and a transformer connected between the high voltage DC bus and the low voltage DC bus, the method comprising:

selectively performing at least one of:
simultaneously providing power from the low voltage DC bus to the high voltage DC bus and an AC load through the transformer;
simultaneously providing power from the high voltage DC bus to the low voltage DC bus and the AC load through the transformer; and
simultaneously providing power from a shore power source to the AC load, and to the low voltage DC bus and high voltage DC bus through the transformer.

2. The method of claim 1, wherein simultaneously providing power from the high voltage DC bus to the low voltage DC bus and the AC load through the transformer includes:

providing a DC signal from the high voltage DC bus to an inverter circuit;
inverting the DC signal to produce an AC signal; and
providing the AC signal to the transformer.

3. The method of claim 2, wherein the AC signal is a high frequency AC signal.

4. The method of claim 2, wherein inverting the DC signal includes:

inverting the DC signal using sine triangle pulse width modulation to produce a high frequency AC signal.

5. The method of claim 1, wherein simultaneously providing power from the high voltage DC bus to the low voltage DC bus and the AC load through the transformer includes:

rectifying a high frequency AC signal received from the transformer to produce a DC signal;
filtering the DC signal;
providing the filtered DC signal to the low voltage DC bus;
filtering another high frequency AC signal received from the transformer; and
providing the filtered another AC signal to the AC load.

6. The method of claim 5, wherein providing the filtered another AC signal to the AC load includes:

providing power to at least one of a first AC load associated with a first AC voltage and a second AC load associated with a second AC voltage different than the first AC voltage.

7. The method of claim 6, wherein providing power to at least one of the first AC load and the second AC load includes:

providing power to at least one of the first AC load and the second AC load based on a position of a switch associated with the first AC load and a position of at least one other switch associated with the second AC load.

8. The method of claim 2, wherein the inverter circuit may operate as a rectifier circuit to rectify a second AC signal received from the transformer to provide a DC signal to the high voltage DC bus.

9. The method of claim 1, wherein simultaneously providing power from the low voltage DC bus to the high voltage DC bus and an AC load through the transformer includes:

providing a DC signal from the low voltage DC bus to a inverter circuit;
inverting the DC signal to produce an AC signal; and
providing the AC signal to the transformer.

10. The method of claim 9, wherein inverting the DC signal includes:
inverting the DC signal using sine triangle pulse width modulation to produce the AC signal.

11. The method of claim 9, wherein providing the AC signal to the transformer includes:
rectifying a high frequency AC signal provided by the transformer to produce a DC signal;
filtering the DC signal;
providing the filtered DC signal to the high voltage DC bus;
filtering another high frequency AC signal received from the transformer; and
providing the filtered another AC signal to the AC load.

12. The method of claim 11, wherein the AC load is positioned on the side of the transformer connected to the low voltage DC bus.

13. The method of claim 11, wherein providing the filtered another AC signal to the AC load includes:
providing power to at least one of a first AC load associated with a first voltage and a second AC load associated with a second voltage different from the first voltage.

14. The method of claim 13, wherein providing power to at least one of the first AC load and the second AC load includes:
providing power to at least one of the first AC load and second AC load based on a position of a switch associated with the first AC load and a position of at least one other switch associated with the second AC load.

15. The method of claim 10, wherein the inverter circuit may operate as a rectifier circuit to rectify a second AC signal received from the transformer to provide a DC signal to the low voltage DC bus.

16. The method of claim 1, wherein simultaneously providing power from a shore power source to the AC load, and to the low voltage DC bus and high voltage DC bus through the transformer includes:
providing power from a shore power source to the AC load;
providing power from the shore power source to the transformer; and
simultaneously providing power from the transformer to the high voltage DC bus and the low voltage DC bus.

17. The method of claim 16, wherein providing power to the AC load is performed simultaneously with providing power to the low voltage DC bus and the high voltage DC bus.

18. The method of claim 16, wherein simultaneously providing power from the transformer to the high voltage DC bus and the low voltage DC bus includes:
providing an AC signal received from the shore power source to a pre-regulator to produce a high frequency AC signal;
providing the high frequency AC signal to a low voltage side of the transformer;
rectifying a high voltage high frequency AC signal received from a high voltage side of the transformer to produce a high voltage DC signal; and
rectifying a low voltage high frequency AC signal received from the low voltage side of the transformer to produce a low voltage DC signal.

19. The method of claim 18, wherein rectifying a high voltage high frequency AC signal provided at a high voltage side of the transformer to produce a high voltage DC signal includes:
filtering the high voltage DC signal; and
providing the filtered high voltage DC signal to the high voltage DC bus.

20. The method of claim 18, wherein rectifying a low voltage high frequency AC signal provided at the low voltage side of the transformer to produce a low voltage DC signal includes:
filtering the low voltage DC signal; and
providing the filtered low voltage DC signal to the low voltage DC bus.

21. The method of claim 19, wherein providing the filtered high voltage DC signal to the high voltage DC bus includes:
providing the filtered high voltage DC signal to a chopper circuit; and
controlling power to the high voltage DC bus through the chopper circuit, wherein the chopper circuit may be configured to:
(i) block the high voltage DC signal from being provided to the high voltage DC bus,
(ii) restrict the amount of current associated with the high voltage DC signal provided to the high voltage DC bus, and
(iii) allow the high voltage DC signal to flow to the high voltage DC bus.

22. The method of claim 20, wherein providing the filtered low voltage DC signal to the low voltage DC bus includes:
providing the filtered low voltage DC signal to a chopper circuit; and
controlling power to the low voltage DC bus through the chopper circuit, wherein the chopper circuit may be configured to:
(i) block the low voltage DC signal from being provided to the low voltage DC bus,
(ii) restrict the amount of current associated with the low voltage DC signal provided to the low voltage DC bus, and
(iii) allow the low voltage DC signal to flow to the low voltage DC bus.

23. A system comprising:
a high voltage bus;
a low voltage bus;
a transformer disposed between the high voltage bus and low voltage bus;
a first inverter/rectifier circuit connected between the high voltage bus and a primary side of the transformer;
a second inverter/rectifier circuit interconnected between the low voltage bus and a secondary side of the transformer; and
an AC load connected to a tap positioned on the secondary side of the transformer,
wherein the system is configured to selectively provide power simultaneously to the high voltage bus through the first inverter/rectifier circuit and power to the AC load through the tap, selectively provide power simultaneously to the low voltage bus through the second inverter/rectifier circuit and power to the AC load through the tap, and selectively provide power simultaneously to the AC load from a shore power source and power to the low voltage bus through the second inverter/rectifier circuit and power to the high voltage bus through the first inverter/rectifier circuit.

24. The system of claim 23, wherein the first inverter/rectifier circuit is configured to:

rectify AC signals provided by the transformer to produce DC signals that are provided to the high voltage bus; and invert DC signals provided from the high voltage bus to produce AC signals that are provided to the primary side of the transformer.

25. The system of claim 23, wherein the second inverter/rectifier circuit is configured to:

rectify AC signals provided by the transformer to produce DC signals that are provided to the low voltage bus; and invert DC signals provided from the low voltage bus to produce AC signals that are provided to the primary side of the transformer.

26. The system of claim 23, wherein when the system simultaneously provides power to the high voltage bus through the first inverter/rectifier circuit and power to the AC load through the tap, the second inverter/rectifier circuit operates as an inverter to provide AC signals to the transformer from DC signals provided by the low voltage bus, and the first inverter/rectifier circuit operates as a rectifier to produce DC signals from AC signals provided by the transformer on its primary side.

27. The system of claim 26, wherein the AC signals provided to the transformer are sine triangle pulse modulated high frequency AC signals, and the system further includes:

a filter for filtering a high frequency component associated with the DC signals.

28. The system of claim 26, wherein the transformer provides high frequency AC signals to the tap, and the system further includes:

a filter for filtering a high frequency component associated with the high frequency AC signals provided to the tap.

29. The system of claim 23, wherein when the system simultaneously provides power to the low voltage bus through the second inverter/rectifier circuit and power to the AC load through the tap, the first inverter/rectifier circuit operates as an inverter to provide AC signals to the transformer from DC signals provided from the high voltage bus, and the second inverter/rectifier circuit operates as a rectifier to produce DC signals from AC signals provided by the transformer on its secondary side.

30. The system of claim 23, wherein when the system simultaneously provides power to the AC load from a shore power source and power to the low voltage bus through the second inverter/rectifier circuit and power to the high voltage bus through the first inverter/rectifier circuit, the second inverter/rectifier circuit operates as a rectifier to provide high voltage DC signals to the high voltage bus from high voltage AC signals provided by the transformer, and the second inverter/rectifier circuit operates as a rectifier to provide low voltage DC signals to the low voltage bus from low voltage AC signals provided by the transformer.

31. A system for providing multiple power conversion operations, comprising:

a transformer interconnected between a high voltage DC bus and a low voltage DC bus;

an AC load connected to the transformer through an AC power supply line, wherein the system is configured to selectively:
  (i) provide power simultaneously from the low voltage DC bus to the high voltage DC bus and the AC load, through the transformer,
  (ii) provide power simultaneously from the high voltage DC bus to the low voltage DC bus and the AC load, through the transformer, and
  (iii) provide power simultaneously from a shore power source to the AC load, and, to the low voltage DC bus and high voltage DC bus through the transformer.

32. A system for performing multiple power conversion operations, comprising:

means for simultaneously providing power from a low voltage DC bus to a high voltage DC bus and an AC load through a transformer connected between the high voltage DC bus and the low voltage DC bus;

means for simultaneously providing power from the high voltage DC bus to the low voltage DC bus and the AC load through the transformer; and means for simultaneously providing power from a shore power source to the AC loads, and to the low voltage DC bus and high voltage DC bus through the transformer.

33. A method performed by a multi-function system including a high voltage DC bus, a low voltage DC bus, and a transformer connected between the high voltage DC bus and the low voltage DC bus, the method comprising:

selectively providing power simultaneously from the low voltage DC bus to the high voltage DC bus and an AC load through the transformer;

selectively providing power simultaneously from the high voltage DC bus to the low voltage DC bus and the AC load through the transformer; and selectively providing power simultaneously from a shore power source to the AC load, and to the low voltage DC bus and high voltage DC bus through the transformer.

* * * * *